United States Patent Office.

THOMAS L. COTTEN, OF MADISON COUNTY, MISSISSIPPI, ASSIGNOR TO MARTHA J. COTTEN, OF SAME PLACE.

Letters Patent No. 108,453, dated October 18, 1870.

IMPROVEMENT IN MEDICAL COMPOUND FOR HOG-CHOLERA.

The Schedule referred to in these Letters Patent and making part of the same

*To all whom it may concern:*

Be it known that I, THOMAS L. COTTEN, of the county of Madison and State of Mississippi, have invented a certain new and useful Medicine for the Cure of Measels and Cholera in Hogs, called "Magic Hog Medicine;" and I do hereby declare that the following is a full, clear, and exact description of the same.

The object of this invention is the production of a medicine or ointment for the cure of the disease called measels or cholera among hogs.

In its composition I use four ingredients, namely, mercurial ointment, carbolic acid, oil of pennyroyal, and flowers of sulphur.

The mercurial ointment having a peculiar constitutional effect upon the animal economy in exciting the secretory system, depressing arterial action, and promoting absorption, allays febrile excitement, and aids the system in ridding herself of any morbific or poisonous matter that may be floating in the circulation.

It is well known that it affects the system as readily through the skin as in any other way, and very probably more so. Another virtue which it possesses in this connection is, that it destroys those vermin known to the world as lice, and which are very common among hogs.

Carbolic acid, possessing great healing powers, is employed for the purpose of healing any lesions of structure in the skin, and being a powerful disinfectant, rids the atmosphere of any contagion that may cause cholera or other diseases.

Oil of pennyroyal drives off fleas or destroys them, thereby enabling the hogs to have rest, quietude, composure, and sleep, which is indispensable to their well-being.

The flowers of sulphur, as is well known to the medical world, possess great curative virtues in all diseases of the skin.

To enable others skilled in the art to make and use my invention, I will now proceed to describe its construction and mode of application.

The articles of which the compound is composed are used in about the following proportions:

Mercurial ointment, one ounce; carbolic acid, one dram, (liquid); oil of pennyroyal, one dram; flowers of sulphur, one-half ounce.

Or, as follows:

One (1) part of carbolic acid and oil of pennyroyal to eight (8) parts of mercurial ointment, and one (1) part of flowers of sulphur to ten (10) parts of mercurial ointment.

These proportions may, of course, be varied without altering the principle of my invention.

The mode of preparation is as follows:

In the summer season, place the mercurial ointment in an earthen vessel, and add to it the oil of pennyroyal and carbolic acid. Stir well with a spatula or small paddle until the ointment is dissolved; then add the flowers of sulphur, and stir until all the ingredients are well mixed.

In winter it may be necessary to place the vessel upon a warm stove to obtain sufficient heat to dissolve the mercurial ointment.

To give the mass sufficient consistency, a tablespoonful of melted tallow may be added and stirred in. If this be not sufficient, and a stiffer compound is desired, add a little melted rosin.

To be used it is only necessary to rub this compound upon the trough, rails or posts where the hogs are in the habit of scratching themselves, and let them apply it, which practical experience has fully demonstrated they will readily do.

Having thus fully described my invention,

What I claim therein as new, and desire to secure by Letters Patent of the United States, is—

A medicine or ointment for the cure of measels or cholera among hogs, composed of the ingredients named, in about the proportions herein set forth.

In testimony whereof, I have signed my name to this specification in the presence of two subscribing witnesses.

THOS. L. COTTEN.

Witnesses:
PHILIP RAIFORD,
EDWD. DAVIS, Sr.